(12) United States Patent
DeCaluwe

(10) Patent No.: US 6,182,691 B1
(45) Date of Patent: Feb. 6, 2001

(54) MOTORCYCLE PETCOCK COVER ASSEMBLY AND METHOD

(75) Inventor: Michael J. DeCaluwe, West Bend, WI (US)

(73) Assignee: Harley-Davidson Motor Company, Milwaukee, WI (US)

( * ) Notice: Under 35 U.S.C. 154(b), the term of this patent shall be extended for 0 days.

(21) Appl. No.: 09/358,315

(22) Filed: Jul. 21, 1999

(51) Int. Cl.[7] .................................................... F16K 37/00
(52) U.S. Cl. ...................... 137/556.3; 137/377; 137/899; 280/835
(58) Field of Search .................................. 137/556, 899, 137/377, 351, 556.3; 280/835

(56) References Cited

U.S. PATENT DOCUMENTS

| | | | |
|---|---|---|---|
| 3,931,954 | * 1/1976 | Guzzetta | 251/109 |
| 4,068,859 | * 1/1978 | Dittman | 280/304.4 |
| 5,636,654 | * 6/1997 | Helm | 137/315 X |
| 5,993,675 | * 11/1999 | Hagerthy | 210/799 |

OTHER PUBLICATIONS

1998 Custom Chrome catalog, p. 16.25.
1996 Kury Akyn Holding petcock cover installation instructions.
1997 J & P Cycles, p. 6–6.

* cited by examiner

Primary Examiner—Kevin Lee
(74) Attorney, Agent, or Firm—Michael Best & Friedrich LLP

(57) ABSTRACT

A petcock cover assembly including a petcock retainer fitted or attached to a petcock and a cover covering the petcock and attached to the petcock retainer to secure the petcock cover assembly to the petcock. The lever of the petcock is preferably captured and retained within a portion of the petcock retainer, which itself is capable of transmitting torque to the petcock lever. More preferably, the petcock retainer is a bracket having a U-shaped lever retaining portion (within which the lever of the petcock is retained) and a pair of attachment portions extending therefrom for attachment to a rear portion of the cover. Threaded fasteners are preferably passed through matching holes in the cover and the attachment portions, and secure the petcock retainer to the rear of the cover when tightened. Preferably, an insert is fitted and secured to the front of the cover to cover the fasteners and at least a portion of the cover. Although the cover can be of almost any shape sufficient to attach to the petcock retainer and to cover the front and/or side(s) of the petcock lever, the cover preferably has one or more side walls upon which petcock position indicia are located to present petcock position information to a viewer beside the petcock. Petcock position indicia can also be located on the front of the cover for a viewer in front of the petcock cover assembly.

19 Claims, 2 Drawing Sheets

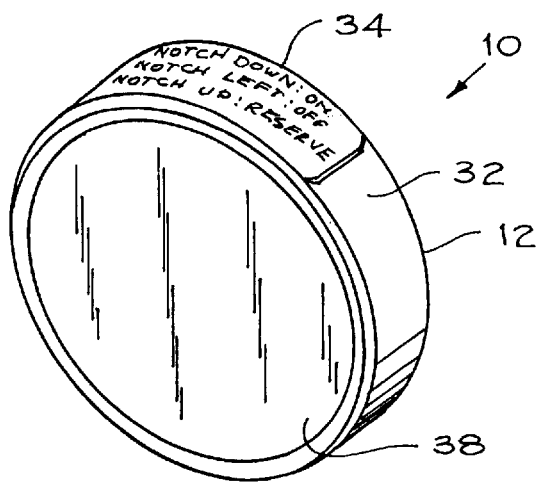
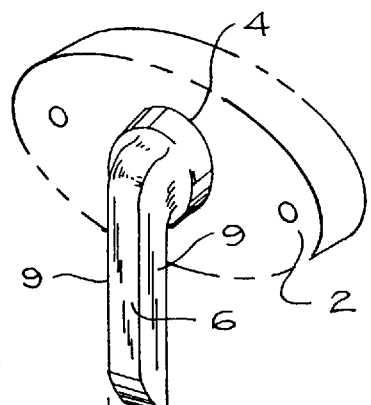
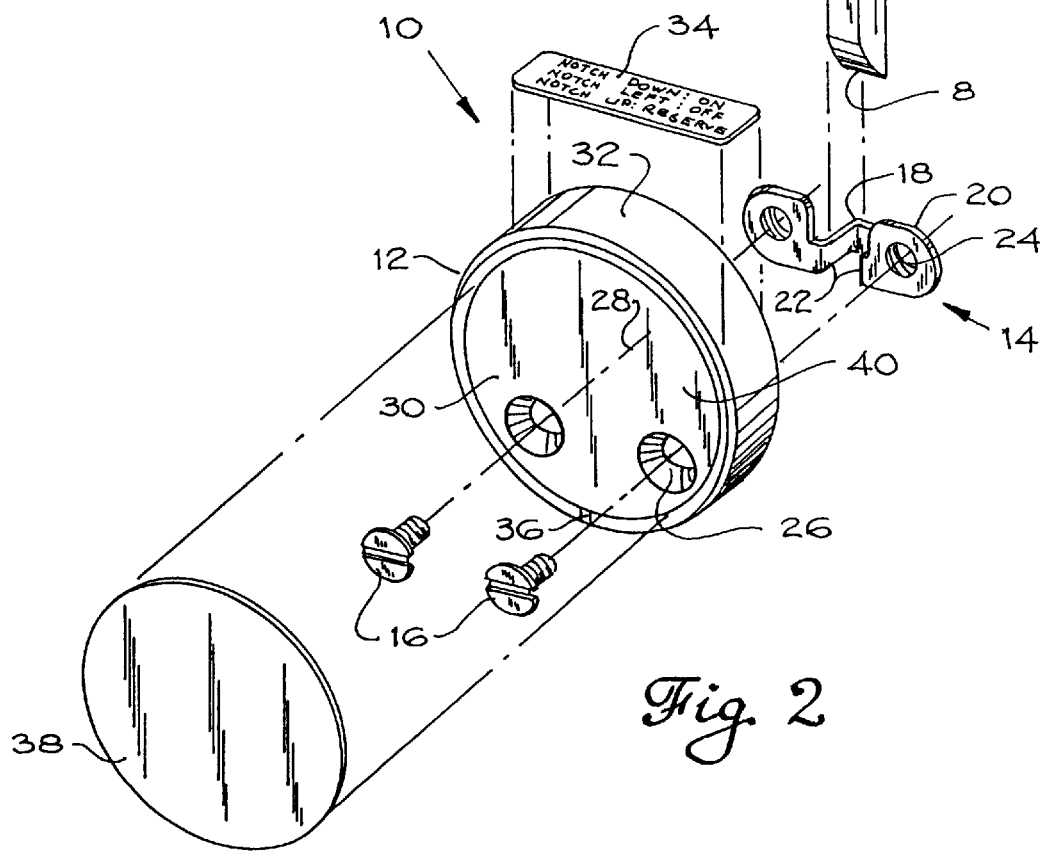

MOTORCYCLE PETCOCK COVER ASSEMBLY AND METHOD

FIELD OF THE INVENTION

This invention relates generally to motorcycles, and more particularly to covers for petcocks such as those found on motorcycles for fuel flow control.

BACKGROUND OF THE INVENTION

Numerous applications exist where it is desirable to modify the appearance of equipment or machinery due to its relatively high visibility. The problems encountered in such modification vary considerably depending upon the final appearance sought and the shape, size and type of equipment or machinery involved. For example, the appearance of a user-operated lever extending from equipment or machinery may not be desirable. In applications such as a fuel petcock for a motorcycle, this appearance is relatively important because of the high visibility of the fuel petcock.

Improving the appearance of a petcock remains a design challenge by virtue of the shape of a petcock lever. A number of devices and assemblies exist for covering or dressing a petcock lever with a lever cover, several of which are found in the motorcycle art. However, each of these devices and assemblies has one or more significant design limitations. For example, one type of petcock cover requires the user to cut off part of the petcock level to install the petcock cover. Other types of conventional petcock covers require removal or disassembly of the petcock in order to install the petcock cover. Permanently modifying the petcock, removing the petcock, and/or disassembling the petcock and associated elements are all less than desirable solutions to the problem of attaching a petcock cover to a petcock.

Another problem existing in conventional petcock covers is the conflict between petcock functionality and aesthetics. Many petcock covers, which are aesthetically designed, have a less-than-optimal mechanical design. For example, certain petcock covers that require modification or removal of the petcock lever (the user-operable lever for opening, closing or changing the state of the petcock) are more difficult to grasp and turn due to their shape and/or size. Where such a cover is for a fuel petcock lever on a motorcycle, a rider may be required to remove his or her gloves to operate the modified petcock lever—an unsafe practice when (as is often the case) the rider desires to turn the petcock lever while the motorcycle is moving.

Also, many existing petcock covers fail to provide a user with information necessary to determine what position the petcock is in. Even where indicia of some sort is provided on the cover, such indicia is either insufficient to provide an unfamiliar user with such information, is unable due to the cover shape and/or size to provide such information, or is incapable of displaying such information in all positions of the petcock lever and/or cover.

A factor significantly limiting the design of petcock covers is the manner of attachment of the cover to the petcock. A balance must often be struck between a well-secured petcock cover and an aesthetically pleasing petcock cover.

In light of the problems and limitations of the prior art described above, a need exists for a petcock cover and assembly method which provides an aesthetically pleasing appearance to a petcock while being easy to install, being capable of installation without modifying the petcock or requiring petcock removal or equipment disassembly, improving petcock access and manipulation by a user, enabling quick user recognition of petcock positions, and providing for a secure cover-to-petcock connection. Each embodiment of the present invention achieves one or more of these results.

SUMMARY OF THE INVENTION

The petcock cover assembly of the present invention includes a petcock retainer fitted to the petcock lever and a cover attached to the petcock retainer. The petcock retainer receives or is otherwise attached to the petcock lever to transmit torque from the cover to the petcock lever. Particularly where the petcock lever has an elongated arm shape, the petcock retainer has a U-shaped portion within which the petcock lever arm of the petcock is received. Walls of the U-shaped portion abut the lever arm when the petcock retainer is pivoted with the cover, thereby transmitting torque from the cover to the petcock retainer to the petcock lever. The petcock retainer preferably has at least one attachment portion by which the petcock retainer is attached to a rear portion of the cover.

The cover preferably covers the front and sides of the petcock, but at least covers either the front or a side of the petcock. The cover is preferably round in shape, with a round front wall and a side wall depending therefrom encircling the petcock lever. Fasteners preferably attach a surface on the rear of the cover to the petcock retainer to secure the cover to the petcock retainer. More preferably, threaded fasteners pass through apertures in the front wall of the cover and into matching apertures in the attachment portions of the petcock retainer to secure the cover to the petcock retainer. An insert preferably covers the front wall of the cover and the fasteners.

To assist in the identification of the petcock position, the petcock cover assembly can be provided with petcock position indicia on the side wall(s) and/or on the front of the cover. Preferably, indicia are provided in multiple locations on the side walls of the cover so that when the cover is rotated to various cover positions, indicia are visible from the same location beside the cover.

The petcock cover assembly is assembled upon a petcock lever by first fitting or attaching the petcock retainer to the petcock, then (or simultaneously) fastening the cover with petcock position indicia thereon to the petcock retainer. Threaded fasteners are preferably passed through apertures in the front wall of the cover and into corresponding threaded apertures in the attachment portions of the petcock retainer. When tightened, these fasteners secure the cover and the petcock retainer to the petcock lever for rotation therewith. Finally, the insert is preferably secured to the front of the cover to cover the fasteners and at least a portion of the front of the cover.

Still other advantages and features of the invention, together with the organization and manner of operation thereof, will become apparent from the following detailed description when taken in conjunction with the accompanying drawings wherein like elements have like numerals throughout the drawings.

BRIEF DESCRIPTION OF THE DRAWINGS

The present invention is further described with reference to the accompanying drawings, which show a preferred embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts:

FIG. 1 is an assembled perspective view of the petcock cover assembly according to a preferred embodiment of the present invention;

FIG. 2 is an exploded perspective view of the petcock cover assembly illustrated in FIG. 1.

DETAILED DESCRIPTION OF THE PREFERRED EMBODIMENTS

Figure 3:
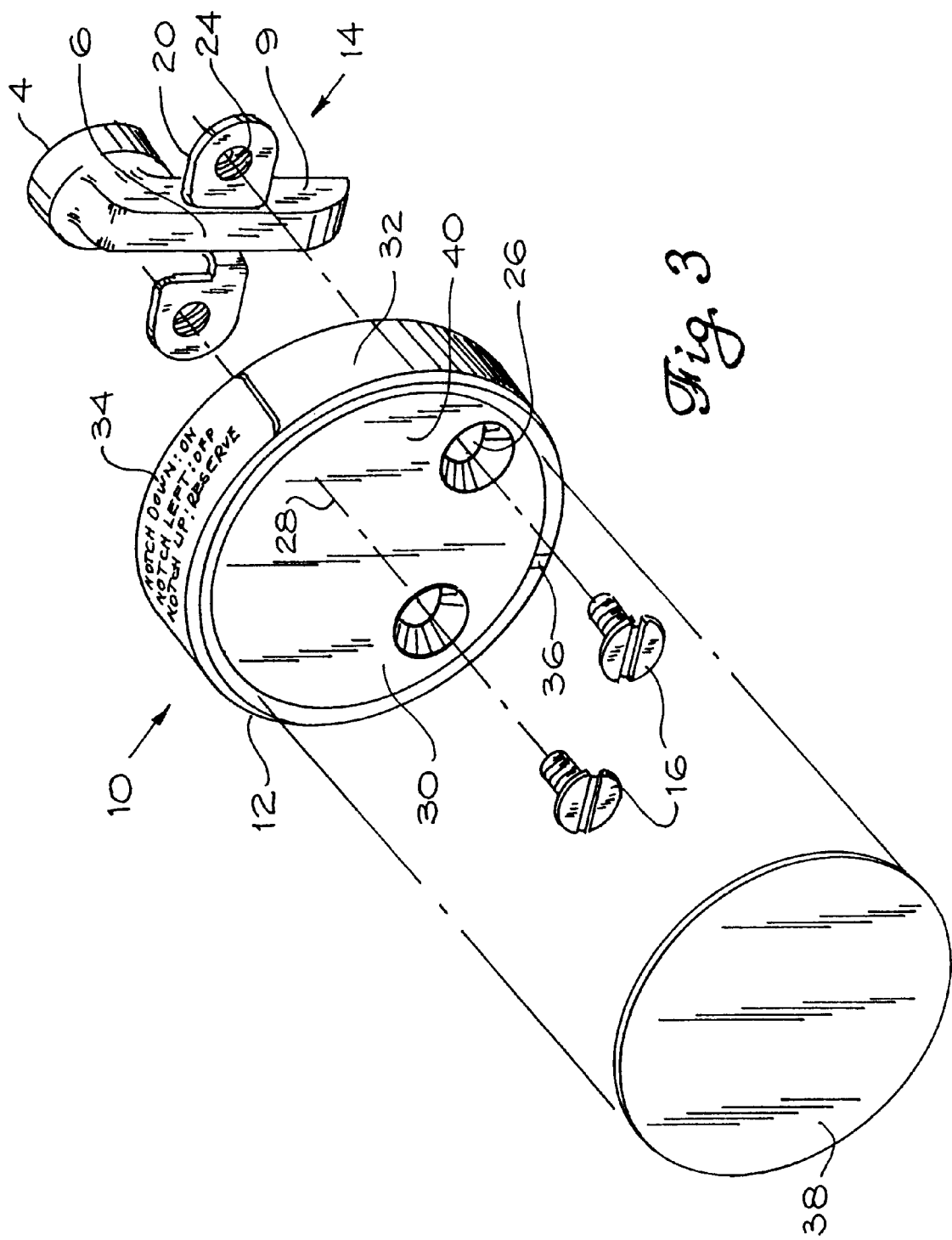
FIG. 3 is perspective view, partially assembled, of the petcock cover assembly illustrated in FIGS. 1 and 2.

The petcock cover assembly of the present invention is illustrated in FIG. 1 as it would appear installed upon a petcock. Conventional petcocks typically have a user-operable lever 6 extending from a base 4 (see petcock 2 in FIGS. 2 and 3). To open, close, or otherwise change the operational state of the petcock 2, a user presses against the lever 6, thereby pivoting the petcock lever 6 and its base 4. The petcock cover assembly 10 of the present invention is attached to and covers the petcock lever 6 and preferably covers substantially all of the petcock 2. The user therefore changes the operational state of the petcock 2 by turning the cover assembly 10 to turn the petcock lever 6.

The illustrated petcock cover assembly 10 includes a cover 12, a petcock lever retainer 14, and fasteners 16 coupling the cover 12 to the petcock lever retainer 14. Proper petcock assembly operation requires that torque applied by a user to the cover 12 is transmitted to the petcock lever 6 in order to open, close, or otherwise change the operational position of the petcock 2. Therefore, the petcock cover assembly 10 should be properly attached to the petcock 2 and be able to withstand normal operational torque exerted by a user to the petcock cover assembly 10.

The illustrated petcock lever retainer 14 is a bracket having a lever retaining portion 18 and two attachment portions 20. The illustrated lever retaining portion 18 is U-shaped to receive the lever 6 of the petcock 2 as best shown in FIG. 3, and the two attachment portions 20 flank the U-shaped lever-retaining portion 18. As described in more detail below, the petcock lever retainer 14 transmits torque from the cover 12 to the petcock lever 6. Therefore, the U-shaped lever retaining portion 18 has abutment surfaces 22 abutting the lever 6 of the petcock 2 when the petcock cover assembly 10 is turned. It will be appreciated by one having ordinary skill in the art that the lever-retaining portion 18 can be of a large number of different shapes to receive the lever 6 of the petcock 2 and to provide at least one contact surface for transmitting torque from the cover 12 to the petcock lever 6. For example, the lever retaining portion 18 can be shaped to retain the tip 8, the sides 9, and the base 4 of the petcock lever 6, and any one or more of these petcock portions. Of course, a consideration in the shape of the petcock lever retainer 14 is the leverage required to pivot the petcock lever 6. The best leverage for pivoting the petcock lever 6 is obtained from exerting force closest to the tip 8 of the petcock lever 6. However, space limitations beneath the cover 12 and the shape complexity of the petcock lever retainer 14 necessary to retain the tip 8 are also factors in choosing the desired petcock lever retainer 14 shape.

Another important factor in the shape and design of the petcock lever retainer 14 is the shape of the petcock lever 6. To provide a well-captured lever 6 of the petcock 2, the petcock lever retainer 14 is preferably U-shaped to at least partially surround the lever 6. Other lever shapes may require a more fully enclosed lever 6 to ensure adequate capture of the lever 6 for torque transmittal. For example, the petcock lever retainer 14 can be a sleeve fitted over the lever 6 and having flanges extending therefrom similar to the attachment portions 20 shown in the figures. The petcock lever retainer 14 can instead be a pair of plates flanking any part of the lever 6 and attached together in any number of manners to retain the lever 6. The petcock lever retainer 14 can also be a socket fitted over the base 4 and having flanges extending therefrom similar to the attachment portions 20 shown in the figures. In all of these petcock retainer embodiments, some portion or portions of the petcock lever retainer 14 is shaped and sized to fit beside, over, or onto the petcock lever 6 in a manner permitting torque to be transmitted between the petcock lever retainer 14 and the petcock lever 6.

Though not preferred, one or more fastening devices can be used to further secure the petcock lever retainer 14 to the petcock lever 6. For example, in the embodiment of the present invention illustrated in the figures, one or more setscrews (not shown) can be passed through threaded apertures in the abutment surfaces 22 of the U-shaped lever retaining portion 18 to press against the lever 6. Other types of conventional fastening devices can also be used, including without limitation other screw types, clamps, rivets, welds, brazes, epoxy, etc. Because it is most desirable to be able to remove the petcock lever retainer 14 from the petcock 2, the U-shaped lever retaining portion 18 is preferably the same width or slightly smaller than the width of the lever 6 so that there is a clearance or slight interference fit between the petcock lever retainer 14 and the petcock lever 6.

The above discussion regarding the shape and design of the petcock lever retainer 14 applies with equal force to petcocks which do not have levers which are elongated or shaped as illustrated in the figures. In such cases, the petcock lever retainer 14 has one or more portions or elements which are in torque transmitting positions relative to the petcock lever 6 (beside, over, or on the petcock lever 6) such that when the petcock lever retainer 14 is turned as described below, these portions or elements abut against the petcock lever 6 to turn the petcock lever 6.

As mentioned above, the petcock lever retainer 14 is provided with at least one attachment portion 20. The attachment portion 20 is used to attach the petcock lever retainer 14 to the cover 12. The illustrated petcock lever retainer 14 has two attachment portions 20 which are flanges extending from the U-shaped lever retaining portion 18. However, the attachment portion or portions can take a number of different shapes depending largely upon the manner in which the petcock lever retainer 14 is attached to the cover 12. In the preferred embodiment of the present invention illustrated in the figures, the attachment portions 20 are flange shaped to allow sufficient room for apertures 24 within the attachment portions 20. The flange shaped attachment portions 20 are attached to the cover 12 by the threaded fasteners 16 passed through countersunk apertures 26 in the cover 12 and into the apertures 24 in the attachment portions 20. The apertures 24 in the attachment portions 20 are threaded for this purpose. As indicated above, other manners of attachment are also possible. For example, the flange shaped attachment portions 20 can be attached to the cover 12 in any number of manners well known to those skilled in the art, including without limitation by other threaded fasteners, riveting, welding, brazing, gluing, pressure bonding and nailing. The attachment portions 20 can even have tongues, flanges, pins, or other portions which mate (i.e., snap-fit, interference fit, etc.) with slots, apertures, grooves, or other receiving elements in the cover 12 and/or vice versa. To this end, the entire body of each attachment portion 20 can be shaped and sized to fit or mate with corresponding structure on the rear of the cover 12.

Preferably, the petcock cover assembly 10 pivots about a central axis 28 that is coincident with the axis about which the petcock lever 6 pivots. Therefore, the apertures 26 in the cover 12 are aligned a distance from the central axis 28 of the cover 12 so that the cover 12 rotates about the same axis as the base 4 of the petcock lever 6. In an alternate embodiment of the present invention the apertures 24 in the petcock lever retainer 14 are aligned with the pivot point of the base 4, thereby aligning the apertures 26 in the cover 12 with the central axis 28 of the cover 12. Therefore, the locations of the apertures 26 in the cover 12 also depend at least partially upon the shape and design of the petcock lever retainer 14, and can therefore vary in still other embodiments from the positions shown in the figures.

The illustrated cover 12 covers the front and sides of the petcock lever 6. However, depending upon the particular appearance of the petcock 2 desired, the cover 12 can instead cover one or more sides of the petcock lever 6, the front and one or more sides of the petcock lever 6, or just the front of the petcock lever 6. The cover 12 can take any number of shapes, including without limitation square, diamond, rectangular, or other polygonal shapes, round, oval, teardropped, spherical, football, and egg shapes. In short, the cover 12 can take virtually any shape capable of being attached to the petcock lever retainer 14. However, it is most desirable that the cover 12 is easily grasped and manipulated by a user. For this purpose, the cover 12 of the preferred embodiment illustrated in the figures is a short cylindrical body with a closed upper end. The illustrated cover 12 has a front wall 30 and a side wall 32 depending therefrom. The fasteners 16 attaching the cover 12 to the petcock lever retainer 14 pass through apertures 26 in the front wall 30 of the cover 12. However, it will be appreciated by one having ordinary skill in the art that the petcock lever retainer 14 can also or instead be attached in a manner described above to the side wall 32 of the cover 12, thereby calling for a differently shaped petcock lever retainer 14.

Regardless of the particular shape of the cover 12, the cover 12 preferably has at least one side wall 32. Although not required (e.g., in a bubble-shaped cover 12), the side wall 32 of the cover 12 permits petcock position indicia 34 to be located upon a side of the cover 12. The term "indicia" as used herein and in the appended claims means any type of lettering, words, symbols, or other marking indicating the rotational position of the cover 10.

As shown in the figures, the cover 12 has petcock positioning indicia 34 providing information about the positions of the cover 12 relative to the positions of the petcock 2. A user may not always be facing the front wall 30 of the petcock cover assembly 10. For example, if the user is seated upon a motorcycle and if the petcock cover assembly 10 covers the fuel petcock 2 of the motorcycle, the user will typically be viewing the side wall 32 of the cover 12. Petcock position indicia located upon the front wall 30 of the cover 12 is therefore less than desirable, and indicia located upon the side wall 32 of the cover 12 is most preferable. As used herein and in the appended claims, the term "side" or "beside" with respect to the cover 12 means radially disposed with respect to the pivot axis of the petcock lever 6.

The illustrated indicia 34 is in the form of a sticker or decal. However, the indicia 34 can instead be painted on the side wall 32, stamped, molded, carved, or pressed therein, raised therefrom, glued thereon, or be secured thereto in any other manner well known to those skilled in the art (all of which processes are referred to herein and in the appended claims as "placing" indicia). The indicia can also be upon a plate or other member which itself is secured to the cover 12. Preferably, indicia 34 are provided on multiple side walls 32 of the cover 12 such that when the cover 12 is turned to various positions, petcock position indicia 34 are presented at the same viewing angle beside the cover 12. Where the user is to view the petcock cover assembly 10 from the same viewing angle on the side of the cover 12, the petcock position indicia 34 presented at the viewing angle preferably changes to show the user the current petcock position.

The illustrated cover 12 also includes indicia located on the front wall 30 of the cover 12 in the form of a notch 36. Petcock position indicia can even be located on both the front wall 30 and side wall 32 of the cover 12 (see the notch 36 shown in FIGS. 1–3, which is visible from the front wall 30 as well as the side wall 32 of the cover 12). Like the indicia 34 described above, the indicia 36 on the front wall 30 and/or the front wall 30 and side wall 32 of the cover 12 can be any type of lettering, words, symbols, or other marking indicating the position of the cover 12, and can be located upon the cover 12 in any of the manners described above.

Especially where fasteners such as screws 16 are used and are visible after installation of the cover 12 upon the petcock 2, it is preferable to cover the cover 12 with an insert 38. If desired, the insert 38 can be provided with words, lettering, symbols, or graphics for decorative purposes and/or to indicate the position of the petcock 2 as described above. The insert 38 can be fastened to the cover 12 in any number of conventional manners, but is preferably either snap or press fit into a recess 40 in the front wall 30 of the cover 12 or is bonded thereto by glue, epoxy, adhesive, cohesive, or other such bonding material. It should be noted that the particular shape of the insert 38 can vary significantly while still achieving the above-stated functions. For example, the insert 38 can extend around the sides of the cover 12, can have one or more apertures therethrough or have a substantially open front, can be flat or curved, etc.

To install the petcock cover assembly of the present invention on a petcock 2, a user first fits the petcock lever retainer 14 upon the petcock lever 6. As discussed above, this process can include receiving or snap-fitting the lever 6 of the petcock 2 inside a U-shaped portion of the petcock lever retainer 14, fitting the tip 8 of the lever 6 inside a portion of the petcock lever retainer 14, sliding the lever 6 of the petcock 2 inside a sleeve of the petcock lever retainer 14, etc. Preferably, the cover is then (or simultaneously) placed over the petcock 2 and the petcock lever retainer 14, and is fastened thereto via the fasteners 16 or by another conventional fastener. The cover 12 is preferably manufactured with indicia 34, 36 thereon. Finally, the insert 38 is preferably fitted over the front 30 of the cover 12. When the petcock cover assembly 10 is for use on a motorcycle, the petcock position indicia 34 is preferably located in three locations spaced 90 degrees apart on the side wall 32 of the cover 12 so that petcock position indicia 34 is always facing upward toward the seated rider in all three positions of the petcock (at 0, 90, and 180 degrees).

To install the petcock cover assembly in another manner, a user preferably loosely connects the petcock retainer 14 to the cover 12 via the fasteners 16 or by another conventional manner. The loosely-assembled petcock cover assembly is then slid onto the petcock lever 6 and the fasteners 16 (or other conventional connection elements or devices) are tightened to secure the petcock cover assembly to the petcock lever 6.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims. For example, each element of the petcock cover assembly 10 disclosed herein is preferably made of metal. More particularly, the petcock lever retainer 14 and the fasteners 16 are preferably made of steel, while the cover 12 and the insert 38 are preferably made of chrome-plated steel. However, any one or more of these elements can be made of a number of other materials, the selection of which is largely dependent upon the desired appearance of the petcock cover assembly 10. Such materials include without limitation other types of metals, fiberglass, plastic, rubber, urethane, nylon other synthetic materials, composites, ceramic, glass, marble, stone, wood, or combinations thereof.

What is claimed is:

1. A petcock cover assembly for covering a petcock having a lever, the petcock cover assembly comprising:
   a cover having a rear portion; and
   a retainer coupled to said rear portion for movement with said cover, said retainer having a capture portion for receiving at least part of the lever therein.

2. The petcock cover assembly as claimed in claim 1, wherein said cover has walls which at least partially enclose a petcock lever, said retainer coupled to an interior surface of at least one of said walls.

3. The petcock cover assembly as claimed in claim 1, further including position indicia positioned on an exterior surface of said cover.

4. The petcock cover assembly as claimed in claim 3, wherein said position indicia is on at least one side surface of said cover and is visible from a position beside a petcock.

5. The petcock cover assembly as claimed in claim 3, wherein said position indicia is on at least one of a side surface and a front surface of said cover for visibility from at least one of a position beside a petcock and a position in front of the petcock, respectively.

6. The petcock cover assembly as claimed in claim 1, further comprising at least one fastener coupling said retainer to said cover, said at least one fastener including at least one threaded fastener positioned through aligned apertures defined in said cover and said retainer.

7. The petcock cover assembly as claimed in claim 1, wherein said retainer includes a U-shaped portion within which the lever is retained.

8. The petcock cover assembly as claimed in claim 1, further comprising an insert covering a front portion of said cover.

9. A motorcycle petcock and cover assembly, comprising:
   a motorcycle petcock;
   a lever extending from said motorcycle petcock;
   a cover at least partially covering said lever; and
   a retainer wrapped around said lever and coupling said cover to said lever.

10. The cover assembly as claimed in claim 9, wherein said retainer comprises a bracket having a portion shaped to receive at least a portion of said lever.

11. The cover assembly as claimed in claim 10, wherein said portion of said bracket at least partially encircles said lever.

12. The cover assembly as claimed in claim 9, further comprising at least one fastener coupling said retainer to said cover.

13. The cover assembly as claimed in claim 12, further comprising an insert coupled to said cover and covering said at least one fastener.

14. The cover assembly as claimed in claim 9, further comprising position indicia positioned on said cover, said position indicia being visible from a location beside said cover.

15. The cover assembly as claimed in claim 14, wherein rotation of said cover brings additional position indicia into view from said location beside said cover.

16. A method for assembling a petcock cover to a petcock having a lever, said method comprising the steps of:
    positioning a retainer around a rear surface of the lever;
    positioning the cover over a front surface of the lever; and
    coupling the retainer to the cover, wherein rotation of the petcock cover transmits torque to the retainer which in turn transmits torque to the lever to turn the petcock.

17. The method as claimed in claim 16, wherein said step of coupling the retainer to the cover includes inserting at least one fastener through the retainer and into the cover.

18. The method as claimed in claim 16, further comprising the step of coupling an insert over the cover.

19. The method as claimed in claim 16, further comprising the step of placing petcock position indicia upon the petcock cover.

\* \* \* \* \*